No. 607,175. Patented July 12, 1898.
R. M. KEATING.
WHEEL.
(Application filed May 23, 1896.)
(No Model.) 2 Sheets—Sheet 1.

Witnesses
L. H. Horner
E. C. Stickney.

Inventor
Robert M. Keating
By Allen Webster
Attorney

No. 607,175. Patented July 12, 1898.
R. M. KEATING.
WHEEL.
(Application filed May 23, 1896.)

(No Model.) 2 Sheets—Sheet 2.

Fig. 3.

UNITED STATES PATENT OFFICE.

ROBERT M. KEATING, OF SPRINGFIELD, MASSACHUSETTS.

WHEEL.

SPECIFICATION forming part of Letters Patent No. 607,175, dated July 12, 1898.

Application filed May 23, 1896. Serial No. 592,723. (No model.)

*To all whom it may concern:*

Be it known that I, ROBERT M. KEATING, a citizen of the United States of America, residing in Springfield, in the county of Hampden and State of Massachusetts, have invented new and useful Improvements in Wheels, of which the following is a specification, reference being had to the accompanying drawings and letters of reference marked thereon.

The object of my invention is to provide an improved construction of wheels more particularly adapted for bicycles, tricycles, and other wheeled vehicles in which wire spokes are usually employed.

My especial object is to provide a construction of such wheel wherein the spokes will be fixed in a true tangential line and wherein the spokes will be straight from end to end and the draw or tension be in a direct line.

My object is, further, to provide a construction wherein the parts may be easily and quickly assembled and wherein the spokes may be readily removed and replaced.

Figure 1:
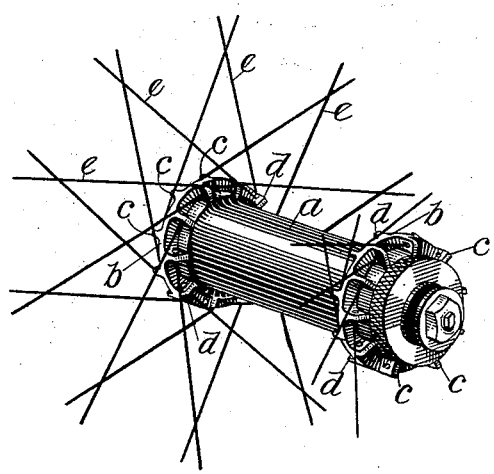
Figure 2:
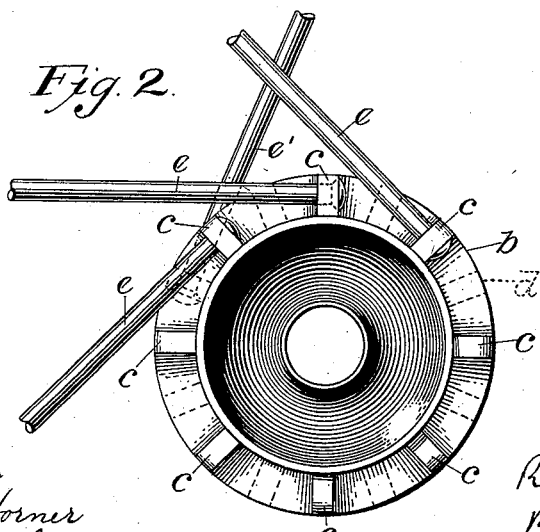

In the accompanying drawings, in which like letters of reference indicate like parts, Figure 1 is a perspective view of a wheel-hub, illustrating my improved construction, the spokes being only partially shown; and Fig. 2 is an end view on an enlarged scale, portions of four spokes only being shown. Fig. 3 is a detail perspective wherein the arrangement of the spoke-lugs is shown in their relation to each other.

In detail, *a* indicates the body portion of the hub; *b*, annular flanges, rings, or enlargements thereon; *c* and *d*, lugs or projections, and *e* spokes.

The construction of my device will be readily understood on reference to the drawings, wherein are shown annular end flanges *b*, formed on or secured to the ends of the hub, having a series of oppositely-extending lateral spoke-lugs *c d*, provided with suitable openings to receive and retain the lower ends of the spokes, which are arranged to lie in tangential lines substantially parallel to the radii of the wheel, the lugs on one side of the central flange being adapted for spokes projecting in one direction and the lugs on the opposite side thereof being intended for spokes projecting in the other direction. It will be perceived that the spoke-lugs on the opposite sides of the respective central annular flanges are disposed in non-coincident alternation, the arrangement of one series in relation to the other series being such that there are not two lugs in the same axial line. This arrangement produces a wheel in which the spokes are truly tangential and without curvature or bend in the spokes, and since no two spokes can be entered in the rim at the same point it is essential that each lug of a series shall be fixed on non-recurring lines in relation to the opposite series. These projections are preferably recessed or countersunk slightly, so as to allow the upset end of the spoke to rest in such recess and obtain a substantial bearing, although it will be seen that such recessing is not necessary. These lugs or projections are formed at each side of and integral with the annular flanges *b*, as by this construction I am enabled to make the lugs of less thickness while attaining the desired degree of strength and rigidity.

Although I prefer that the flange and lugs be formed integral with the body portion *a* of the hub, it will readily be seen that they may be formed upon an independent ring mounted upon the hub and this ring forced, brazed, or otherwise secured in position and the desirable results of my invention attained.

Having therefore described my invention, what I claim, and desire to secure by Letters Patent, is—

In a wheel of the character described, a hub, annular vertical flanges adjacent to each end of the hub, a plurality of laterally-extending radially-disposed spoke-flanges in non-coincident alternation on the opposite faces of the annular flanges, integral with the hub at their base and with the annular flanges at their inner side edges and provided with spoke-holes, as shown and specified.

ROBERT M. KEATING.

Witnesses:
ALLEN WEBSTER,
P. B. PHELAN.